US011655051B2

(12) United States Patent
Washington, II et al.

(10) Patent No.: US 11,655,051 B2
(45) Date of Patent: *May 23, 2023

(54) ELECTRONIC BAG LOCKING AND UNLOCKING

(71) Applicant: The Government of the United States of America, as represented by the Secretary of Homeland Security, Washington, DC (US)

(72) Inventors: William J. Washington, II, North Potomac, MD (US); Christian Jordan, Baltimore, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,427

(22) Filed: Aug. 2, 2022

(65) Prior Publication Data

US 2022/0388683 A1 Dec. 8, 2022

Related U.S. Application Data

(63) Continuation of application No. 17/479,766, filed on Sep. 20, 2021, now Pat. No. 11,407,528, which is a continuation of application No. 17/182,870, filed on Feb. 23, 2021, now Pat. No. 11,161,626.

(60) Provisional application No. 63/051,138, filed on Jul. 13, 2020, provisional application No. 62/981,285, filed on Feb. 25, 2020.

(51) Int. Cl.
*G06Q 50/30* (2012.01)
*B64F 1/36* (2017.01)

(52) U.S. Cl.
CPC .............. *B64F 1/366* (2013.01); *B64F 1/368* (2013.01); *G06Q 50/30* (2013.01)

(58) Field of Classification Search
CPC ......... B64F 1/366; B64F 1/368; G06Q 10/08; G06Q 10/083; G06Q 50/30; G07B 15/00; G07B 15/02
USPC .......................... 235/384, 375, 487; 705/417
See application file for complete search history.

(56) References Cited

U.S. PATENT DOCUMENTS

| 9,147,117 B1 | 9/2015 | Madhu et al. |
| 9,305,155 B1 | 4/2016 | Vo et al. |
| 9,436,818 B1 | 9/2016 | Tooley, III |
| 9,672,336 B1 | 6/2017 | Spence |

(Continued)

FOREIGN PATENT DOCUMENTS

| CN | 108694764 A | 10/2018 |
| WO | 2016/130168 A1 | 8/2016 |

*Primary Examiner* — Edwyn Labaze
(74) *Attorney, Agent, or Firm* — Lavanya Ratnam; Robert W. Busby; Kelly G. Hyndman

(57) ABSTRACT

A bag unlocking method includes receiving, by a bag handling system, a bag during a check-in process. The bag handling system identifies, from a travel carrier system, traveler information corresponding to the bag. A securing device of the bag is programmed, using an unlock code pertaining to the traveler information. The bag handling system reads a bag tag of the bag at a baggage inspection station and determines the unlock code pertaining to the bag tag. The bag handling system transmits the unlock code to cause the securing device to unlock at the baggage inspection station.

30 Claims, 6 Drawing Sheets

(56) References Cited

U.S. PATENT DOCUMENTS

| | | |
|---|---|---|
| 10,013,983 B1 | 7/2018 | Johnson et al. |
| 10,200,397 B2 | 2/2019 | Dhar et al. |
| 10,503,912 B1 | 12/2019 | Kerr |
| 10,970,375 B2 | 4/2021 | Shila et al. |
| 11,005,839 B1 | 5/2021 | Shahidzadeh et al. |
| 2003/0225612 A1* | 12/2003 | DeSimone ............ G06Q 40/08 705/13 |
| 2004/0246097 A1 | 12/2004 | Queenan |
| 2005/0051622 A1 | 3/2005 | Mak |
| 2006/0111123 A1 | 5/2006 | Nerat |
| 2006/0266563 A1* | 11/2006 | Kaplan ................ G01G 19/58 177/245 |
| 2007/0018813 A1 | 1/2007 | Liggitt |
| 2007/0079136 A1 | 4/2007 | Vishik et al. |
| 2007/0214357 A1 | 9/2007 | Baldus et al. |
| 2008/0184037 A1 | 7/2008 | Johnson |
| 2009/0173112 A1 | 7/2009 | Tropp |
| 2013/0013553 A1 | 1/2013 | Stibel et al. |
| 2013/0097047 A1 | 4/2013 | Kim |
| 2013/0249673 A1 | 9/2013 | Ferrari |
| 2013/0264128 A1 | 10/2013 | Plato et al. |
| 2014/0207537 A1 | 7/2014 | Joyce et al. |
| 2015/0074268 A1 | 3/2015 | Alms |
| 2016/0055322 A1 | 2/2016 | Thomas |
| 2016/0078581 A1 | 3/2016 | Maher |
| 2016/0116510 A1 | 4/2016 | Kalous et al. |
| 2017/0032485 A1 | 2/2017 | Vemury |
| 2017/0074002 A1 | 3/2017 | Cooper |
| 2018/0012324 A1 | 1/2018 | Kelts |
| 2018/0165655 A1 | 6/2018 | Marcelle et al. |
| 2018/0336327 A1 | 11/2018 | Wallace et al. |
| 2018/0337917 A1 | 11/2018 | Wallace et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0163876 A1 | 5/2019 | Remme et al. |
| 2019/0163887 A1 | 5/2019 | Frederick et al. |
| 2019/0164165 A1 | 5/2019 | Ithabathula |
| 2019/0213820 A1 | 7/2019 | Sebes et al. |
| 2019/0287111 A1 | 9/2019 | Cvetkovich et al. |
| 2020/0012912 A1 | 1/2020 | Klimt |
| 2020/0034553 A1 | 1/2020 | Kenyon et al. |
| 2020/0036528 A1 | 1/2020 | Ortiz et al. |
| 2020/0084039 A1 | 3/2020 | Chabanne et al. |
| 2020/0168306 A1 | 5/2020 | Chen et al. |
| 2020/0351089 A1 | 11/2020 | Wentz |

\* cited by examiner

ELECTRONIC BAG LOCKING AND UNLOCKING

CROSS-REFERENCE TO RELATED APPLICATIONS

This application is a continuation of U.S. non-provisional application Ser. No. 17/479,766 entitled "Electronic Bag Locking and Unlocking," filed Sep. 20, 2021; which is a continuation of U.S. non-provisional application Ser. No. 17/182,870 entitled "Electronic Baggage Locks," filed Feb. 23, 2021; which claims the benefit of U.S. Provisional Application No. 62/981,285 entitled "Electronic Baggage Locks," filed on Feb. 25, 2020; and U.S. Provisional Application No. 63/051,138 entitled "Electronic Baggage Locks," filed on Jul. 13, 2020; the disclosures of all of which are incorporated herein by reference in their entireties.

STATEMENT OF GOVERNMENT INTEREST

The present invention was made by one or more employees of the United States Department of Homeland Security in the performance of official duties.

FIELD

The discussion below relates generally to methods of improving airline luggage inspection, particularly the methods of increasing security and decreasing intrusiveness of such inspections.

BACKGROUND

Since the terrorist attacks of Sep. 11, 2001, the Transportation Security Administration (TSA), a division of the United States Department of Homeland Security (DHS), has increased the security at United States airports. This increased security includes the screening of traveler luggage for suspicious or illegal contents. Prior to Jan. 1, 2003, the TSA announced that if a piece of traveler luggage selected for additional screening was locked, the lock would be broken to allow access. The TSA encouraged travelers to leave their baggage unlocked for inspection.

Following this announcement, traveler claims of damaged or lost belongings increased and the sale of luggage locks decreased. U.S. Pat. No. 7,021,537 (537 Patent) was granted for a method of improving airline luggage inspection. This method involved the use of combination locks with a master key lock portion and an identification structure that allows TSA screeners to identify the lock as having a master key lock portion, which uses a supplied master key to unlock the lock. A second patent, U.S. Pat. No. 7,036,728 (728 Patent) uses dial combination locks to accomplish the same method. The locks are generally referred to as "dual function"—meaning they have at least two (2) ways of being opened. The first being by a key or combination associated with the lock, and the second being through a master key. To avoid bag damage and claims, TSA agents can recognize that a given bag uses a type of lock compatible with a master key (by trademark or other lock indicia visible to the TSA agents), then identify the code indicated on the lock, and use the master key corresponding to that code.

Since the introduction of these dual function locks it is estimated that over 800 million dual-function locks are in the market. While the system is effective at providing peace of mind to the travelers who wish to purchase locks, the locks themselves do not offer significantly increased security of luggage because master keys have been lost or broken, so that the locks are forcibly removed by TSA screeners. Additionally, the master keys have been duplicated illicitly, so individuals are able to gain unauthorized access.

Despite the ongoing security issues, luggage lock technologies continue to use the master key lock portion to permit TSA access even as the locks themselves become more advanced. Currently, locks exist that allow the traveler to lock and unlock using Bluetooth or other short-range wireless technology while utilizing the master key lock portion. There are administrative difficulties handling the various aspects of using master keys, e.g., there are not existing TSA procedures about how to handle adding or removing master keys, or determining when there are too many master keys, etc., posing cumbersome challenges for systems to manage physical keys and deal with existing locks in circulation. The existing system that relies on a small number of physical master keys shared among multiple travelers verges on the impractical, because physical master keys may be lost, damaged, or duplicated.

SUMMARY

The detailed description below discloses approaches that may ameliorate the foregoing issues associated with physical master keys or locks, and the procedures involved in managing luggage based on such mechanical locks. Embodiments described herein relate to bag locks (also referred to as securing features or securing devices) that are programmable with unlock codes. In an embodiment, a traveler may provide, to the commercial entity (travel carrier) that will transport the bag, at least one unlock code for the bag. In another embodiment, the traveler may present a digital identity (DI) or credential, such as a mobile driver's license (mDL) or similar identifier as managed by a travel carrier, and the unlock code is associated with or derived from the DI, e.g., through the use of a token. The traveler may present the DI when booking travel reservations, and the carrier's reservation system may retrieve data from the DI to automatically populate the booking reservation to avoid data entry or other errors. The traveler also my present the DI to perform identity verification at a travel venue security checkpoint, or to perform manual verification or automated verification associated with bag drop or bag pickup (e.g., to verify the identity of the traveler who is dropping off or picking up a bag).

The unlock code enables the bag owner to enjoy additional security by allowing the use of customized or unique unlock codes that are potentially specific to the traveler's bag or its securing device. Lock codes may have an additional temporal limitation. The traveler providing a custom code to the carrier is an option. In another embodiment, securing devices use unlock codes corresponding to standardized codes or numbers, such as frequent flyer numbers (or other carrier-assigned traveler numbers) used by carriers for their corresponding respective travelers. Other embodiments enable the travel carrier to receive a custom unlock code from the traveler or prompt the traveler to use a default standardized unlock code (e.g., based on a traveler identifier etc. specific to the traveler). An aspect of the embodiments includes the traveler providing bag unlock codes as part of the travel reservation process. The unlock codes can automatically expire or the traveler can reprogram the unlock codes for each flight or reservation. Another embodiment includes the carrier system generating a bag unlock code for a given bag or bags (e.g., as derived from the DI or as newly generated if consented to by the traveler), and the system generates a time-limited bag unlock code that expires after the bags undergo inspection. In an embodiment, the unlock code to which the travel carrier is privy becomes useless and no longer able to unlock the bag after time passes corresponding to an expected duration for inspection to take place for a given baggage handling procedure. In another embodiment, the unlock code expires after the bags proceed beyond a point in a given bag handling system corresponding to where luggage would possibly be diverted for inspection. Such limits can be implemented by including a time-limit feature in the securing device (for one or multiple unlock codes), by causing the system to reprogram the bag upon completion of bag inspection, or by using other approaches as described herein. These features enhance security, by trusting the carriers with temporary keys that last, e.g., on the order of minutes (commensurate with a time from bag drop-off to bag inspection where the bag unlock code might be used to open the bag for inspection), then the code stops working and is unable to be used to unlock the bag.

The unlock code may be tied to a travel reservation (the travel reservation is associated with, also referred to as being tied to, a reservation code, which is standardized in travel industry. The reservation code is specific to a given travel reservation). That reservation code serves as the traveler identifier for a flight. The luggage identifier, tying a bag to a traveler, is also tied to the reservation code. A trip reservation (profile) is associated to the bag or bags. In an embodiment, the travel carrier generates a bag tag with information tying the bag tag to a given traveler reservation. The travel carrier attaches the bag tag to the bag. In another embodiment the bag is integrated with a programmable electronic bag tag. In yet another embodiment, the securing device includes a programmable electronic bag tag.

Embodiments described herein enhance efficiencies for travel carriers, because the embodiments easily integrate with existing travel carrier systems and processes of check-in, bag tracking, and bag tagging. The bag tag can be paper with a printed barcode, a printed QR-code, a radio frequency identification (RFID) tag (whether programmable or non-programmable), or other technologies to encode traveler information (and unlock code or codes). The embodiments described herein may be adapted for use with existing air-, land-, or sea-based travel carrier infrastructures using existing components such as scanners (also referred to herein as readers) and transmitters. Most carrier automated bag or cargo routing systems (bag handling systems) already use scanners and or readers to transmit data to track and route bags. Embodiments can be integrated into this existing mechanical infrastructure to provide greater security to the bag as it is routed to its destination.

Another aspect of the described embodiments includes using existing bag tags, e.g., by performing a lookup on the existing traveler information printed on bag tags, to retrieve an unlock code for a bag. Embodiments provide enhancements throughout the bag handling process, which can be used during travel reservation (traveler provides the bag unlock code along with other traveler information provided when booking reservations), during check-in or bag drop, such as at a bag at counter or kiosk (traveler confirms that travel carrier has the right bag unlock code), and when applying the bag tag to the bag (travel carrier encodes the unlock code into the bag tag, or verifies the travel carrier back end system stores online a bag unlock code corresponding to token information encoded in the bag tag). The check-in process includes a bag drop, the last point before a bag tag is created and the traveler is separated from their bag.

As used herein, the term "bag" is not limited to the traveler baggage of a commercial carrier, and may be any container capable of containing goods that is secured by a securing device (also referred to as a securing feature or "bag lock") that may be unlocked electronically. The term "travel carrier system" includes systems for operation of a travel carrier, such as a reservation system, a bag handling system, a back end system, online website systems, smartphone application (app) systems, and the like. A QR code (abbreviated from Quick Response code) is the trademark for a type of matrix barcode (or two-dimensional barcode). A barcode is a machine-readable optical label that contains information about the item to which it is attached. In practice, QR codes often contain data for a locator, identifier, or tracker. Embodiments are described in a luggage-handling context, and the principles of this disclosure apply to other situations and environments. Furthermore, the aspects of the embodiments are not limited to airlines and are applicable to other systems that have reservations, bag drops, or unlockable bags for inspections. Embodiments are applicable to transportation systems such as trains, ships or cruises, or anything with valet service for lockable luggage with a bag tag identifying the customer, or which provide an individual trip ID for an individual trip. Accordingly, systems can be implemented so that inspection authorities are prevented from having free access to the bag contents, by using a 'master' unlock code that is just temporary (expires) and will not unlock other peoples' bags. Embodiments thereby enable a "master lock" that is custom-tailored on a per-bag basis. The described embodiments include expiration or valid time limits on the functionality of unlock codes provided to the travel carrier or other entities that will handle bags. The bag unlock codes can be matched to identifying features of a particular trip or reservation, and the bag unlock code also can be changed, e.g., by the traveler using a smartphone app on their smartphone. In an embodiment, the traveler presents a digital identity to the travel carrier, and the travel carrier generates a token, hash, or other identifier for locking or unlocking the bag. In another embodiment, the traveler presents the digital identity to a smartphone app, which generates the token, hash, or other identifier for locking or unlocking the bag. Such approaches can be used at the time of making travel reservations or at the time of bag drop to obtain the unlock code, instead of creating a random or traveler-generated number or unlock code. Thus, the traveler's identity will be used to lock or unlock the bag, and can also be used to ensure safe drop off and pick up of the bag. Such approaches provide security, because the token is matched to the identity of the traveler who corresponds to the bag, e.g., based on their identity as the traveler checking in for the flight reservation made under their identity. Additionally, the identity is obfuscated through use of a token, hash, or equivalent, so it is not necessary to reveal the actual mobile driver's license, digital identity, or identity information when performing the locking or unlocking. Rather, the token, hash, or equivalent is provided or matched in order to lock, unlock, drop off, or pick up.

The detailed description below elaborates on the foregoing, non-limiting embodiments, and on other embodiments not mentioned in this summary. Other features and aspects of the embodiments will become apparent to those of ordinary skill in the art from the following detailed description, which discloses, in conjunction with the accompanying drawings, examples that explain the features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

Figure 1:
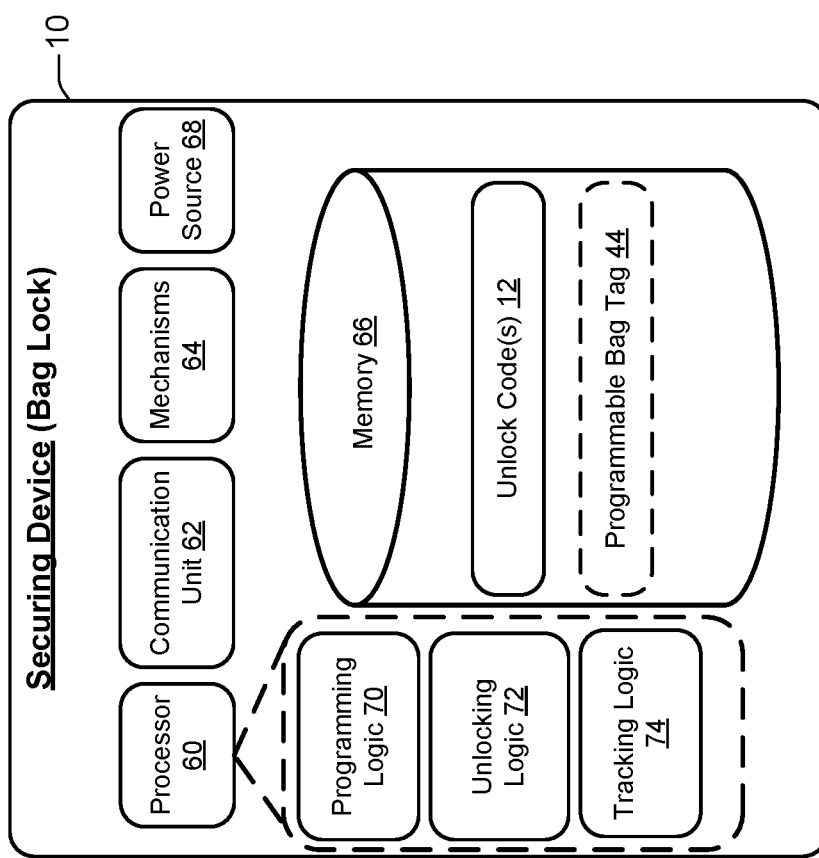
FIG. 1 illustrates a securing device according to an embodiment.

Embodiments described herein present a method of making airline luggage inspection secure while accommodating travelers. Securing device (also referred to as a securing feature or "bag lock") embodiments may have a securing feature controlled by wireless communication such as Bluetooth, near frequency communication (NFC), RFID, Wi-Fi, or other near-range wireless communication protocol. Securing device embodiments may be unlocked through an unlock code (which the traveler conveys to the airline, or which is derived from traveler identity and assigned to the traveler), and which subsequently may be encrypted and affixed to the luggage (e.g., as a bag tag) when the traveler checks the luggage with the airline for a flight.

In an embodiment, an airline travel carrier electronically obtains the non-physical unlock code associated with the traveler for the securing device during the flight registration process, e.g., obtained from the traveler specifying an unlock code, or obtained from a token serving as the unlock code, which was associated with or derived from a digital identification used by the traveler registering for the flight. In another embodiment, a reservation system of the travel carrier associates a unique token or unlock code with the traveler's digital identification, and uses the traveler's digital identification to retrieve the token or unlock code for use in programming, locking, or unlocking the securing device. The travel carrier then associates the unlock code with the rest of the traveler's identifying information. In an embodiment, the traveler uses their digital identity to populate fields of the carrier's travel reservation system, e.g., by swiping their phone or reading (also referred to herein as scanning) a QR code using the phone or an app in the digital identity infrastructure supported by the phone. Therefore, travel carrier uses the traveler's identity to generate the lock or unlock code encoded to the bag tag or bag identifier. The travel carrier has access to that traveler's identity, because that identity will have been used to populate the initial travel reservation perhaps months prior to travel time. When the traveler arrives at the bag drop, the traveler presents the same identity to drop off the bag, which is encoded with that token-based unlock code. Accordingly, there is no risk of a traveler forgetting an unlock code, or changing an unlock code, between the time of making a travel reservation and the time of dropping off the bag. Embodiments also allow the traveler to present their digital identity at check in (e.g., by swiping or presenting a smartphone running a digital identity application or system). The travel carrier's check in system can automatically generate a bag unlock code based on the presented digital identity, at the time of such an automated or carrier-unattended bag drop. Such an automated system does not need information input from the traveler, other than by swiping or otherwise presenting their digital identity to lock the securing device of their bag, and then again to unlock the securing device.

In an embodiment, a liveness check is performed when the traveler picks up the bag, to ensure the traveler physically presenting the digital identity is the person actually depicted in the digital identity. A liveness check is a biometric scan or other verification (e.g., by an attendant physically looking at the traveler and the digital identity), to determine whether the traveler presenting a digital identity matches that digital identity. In an embodiment, such liveness checking is marketed as an upscale or high-end feature, well-suited for expensive bags whose owners desire a secured bag pick up where bag owners are verified before being allowed to pick up a bag. In an embodiment, the act of allowing a traveler to pick up a bag is verified independently of the unlocking of the bag.

In another embodiment, a liveness check is not performed at back pick up. The traveler drops off a bag, and the travel carrier's system identifies that traveler by trusting that the traveler matches the digital identity associated with the bag, without performing a liveness check (by virtue of the traveler being in possession of the bag and therefore presumed to have rightful access to that bag). The travel carrier's system issues to the traveler, or otherwise associates to the traveler's digital identity, a token or similar that the traveler can present to later open the bag. Such a token can be the same as the token, hash, or other indication that is used when the traveler made travel reservations using their digital identity. In another embodiment, the carrier's system can generate a secondary token for the traveler when dropping off the bag, which is used by the traveler to reclaim the bag at back pickup, by the carrier's system performing an electronic match with the secondary token. The electronic match of the token thereby verifies that the traveler presenting the token matches the traveler who dropped off the bag, without performing a liveness check on the traveler. The carrier's system can associate the token with the traveler's digital identity at drop off, and match the token on the bag when the traveler picks up the bag. Such approaches also can be used in automated verification at bag drop off or pick up. The travel carrier may perform automated verification through checks with the carrier's backend systems, which direct automated lockers, cages, or other protections to securely receive and release the bag after automatically matching or verifying the traveler (e.g., by swiping a smartphone to present digital identity information or tokens for matching).

When the traveler checks bags with the travel carrier, the identifying information is placed on the luggage, through a bag tag using visual or electronic coding (e.g., RFID). In an embodiment the unlock code is encrypted before the lock secures the bag. During bag screening, the TSA screener would use a scanner to read or obtain the encrypted unlock code, and transmit it to the securing device, unlocking the securing device. After inspecting the luggage, the TSA screener would re-lock the securing device. In an alternate embodiment, the securing device includes electronics and mechanisms that enable the TSA screener to leave the bag unlocked, and the bag handling system retrieves, scans or reads, and directs the securing device to automatically lock itself.

The securing device embodiments enable manufacturers of the lock or the manufacturers of the bag scanners (whichever is applicable) to supply the TSA with access to a scanning or reading device. The scanning device is capable of decrypting the encrypted unlock code from the bag tag or RFID on the traveler's luggage, and transmitting that unlock code to the securing device. As described in further detail below, such unlocking by scanning device enables the TSA screener to open the bag while not damaging the securing device or the bag. TSA has "access" to the scanning device, which includes having access to any appropriate number of such scanning devices by its workers or by any appropriate division or part of the TSA.

Security processes may or may not select a bag for additional screening. In an embodiment, if a given bag with a securing device or securing feature is selected for additional screening, the encrypted unlock code is identified by a scanning device and the unlock code is transmitted to the securing device or securing feature by a transmitting device. The transmitting device may be the same scanning device. Such transmitting induces the securing feature to unlock itself. In other embodiments the scanning device and transmitting device may be embodied within the functionality of one apparatus.

A securing device embodiment is designed to be applied to one piece of airline-traveler luggage, and have indicia thereon conveying to travelers that the securing device, adapted to store customized unlock codes, may be non-destructively opened. Such indicia may convey to the examining authority (e.g., TSA) that the securing device is capable of being unlocked pursuant to input received from a wireless transmitting device or scanning device. By providing the inspection entity access to the scanning device, the TSA screeners no longer break locks to inspect luggage; the screeners are trained to use the scanning device to open locks affixed with the indicia. The identified process may also be undertaken by representatives of the travel carrier or Airport Authority who are authorized to unlock the locking mechanism of the bag before the bag is provided to the inspection authority (e.g., TSA) to open for inspection of contents.

In an embodiment, a method described herein includes making available to travelers a securing device designed to be applied to an individual piece of bag (e.g., airline luggage). The securing device has a securing feature controlled by a non-physical key, i.e. a wireless interaction (Bluetooth, phone application, etc.). The traveler conveys to the travel carrier the unlock code (or the traveler conveys a digital identity from which the travel carrier derives the unlock code), which can be associated with the traveler and even to individual bags of the traveler. In an embodiment, the unlock code is encrypted and affixed or associated to the bag when the traveler checks the bag with the travel carrier for travel. The securing device also has indicia thereon conveying to the luggage purchasers and to the TSA that the securing device is one such that the TSA will have access to the contents therein and does not need to break the locking mechanism in order to obtain access to the contents therein. The indicia can state, in an embodiment, that the securing device is "recognized" or "accepted" by the TSA. In addition to making the securing device with unlock code associated with the traveler more valuable to prospective luggage or lock purchasers, such indicia also inform the TSA screeners that the securing device can be opened using the encrypted unlock code and is a type of lock that the TSA does not need to forcibly remove.

Embodiments described herein also include providing the TSA with access to the scanning device. In an embodiment, the access is limited to the TSA, and may include the manufacturer, the provider of the securing device to the travelers, and the manufacturer or provider of the scanning device to the TSA. It is anticipated that the manufacturer of the securing device will also provide the scanning device, and other possibilities also are contemplated by the present embodiments. TSA "access" to the scanning device includes having access to any appropriate number of such scanning devices by its workers or by any appropriate division of part of the TSA.

Although methods of improving the inspection of travel bags are described, the methods also make use of apparatuses or systems. An embodiment of such an apparatus is a securing device. Such a system is a baggage handling system that enables bags to be automatically unlocked for inspection. These securing devices and baggage handling systems are illustrated by reference to the accompanying drawings. Consequently, the securing devices and systems are used in conjunction with the various methods described herein.

Electronic, e.g., non-physically controlled, securing devices with unlock codes associated with the traveler have certain advantages over physical locks with physical keys. First, there is no physical key to lose or damage, which minimizes stress for the traveler and eliminates time wasted searching for the key. If the bag is to be opened on short notice, the retrieval of the key is an inconvenience, as is the recall of the physical passcode (e.g., for a physical combination lock). A traveler is far more likely to have immediate access to their phone or electronically available unlock code (stored on the phone or accessible on a remote server), in contrast to searching for a physical copy of a key or attempting to remember a combination for a physical combination lock. Hence, improvements to bag screening at airports provide convenience for travelers, travel carriers, and bag inspectors such as those employed by the TSA.

Embodiments achieve numerous objectives and provide numerous advantages, such as:

(1) providing a method of screening bags at airports that avoids forcible opening of the lock or the bag;

(2) providing a method of screening bags at airports that employs securing devices that remain viable after being subjected to airport bag screening and inspection;

(3) providing a method of non-intrusively searching travelers' bags at airports;

(4) providing a bag screening method that does not use a physical master key that may be duplicated, lost, or broken;

(5) providing a bag screening method that uses a non-physical and specific unlock code selected and supplied by the traveler to the airline;

(6) providing a bag screening method at airports that eliminates a potential security threat of tampering with broken-into bags or bags with broken locks;

(7) providing a method of bag screening that reduces the costs of the TSA;

(8) providing a bag screening method that eliminates the use of lock clippers;

(9) providing a bag screening method that reduces injuries to TSA screeners that may arise from breaking locks;

(10) providing an improved method of bag screening at airports with minor new training;

(11) providing a method of airport bag screening that reduces the liability to the TSA;

(12) providing an improved method of bag screening that would not interfere with current policies of the TSA, namely that allows the TSA to break securing devices if they do not display the indicia conveying that they are "TSA recognized" or "TSA accepted;"

(13) providing a bag screening method that decreases the labor of TSA screeners and enables opening the securing device of the present embodiments with less manual labor than breaking locks;

(14) providing a method of bag screening that provides a public relations benefit to the TSA and the airline in that travelers will appreciate the TSA and airline's concern for their personal property;

(15) providing a method of airport bag screening that allows the TSA to screen bags more efficiently;

(16) providing a method of airport bag screening that allows a thorough search of the traveler's bags while simultaneously providing a less intrusive and more convenient search to the traveler;

(17) providing a method of screening bags at airports that eliminates the danger of tampering with bags that have been broken into subsequent to the screening process;

(18) providing a method that eliminates breaking into the bag in a manner not involving its lock;

(19) creating a convenience for the controller of the bag handling system by way of electronic or digital technology to select suspect bags for TSA inspection;

(20) creating efficiencies for rerouting suspect bags for TSA inspection; and

(21) creating efficiencies for suspect bags rerouted to TSA inspection by transmitting unlock codes associated with the traveler that unlocks the bags, readying them for TSA inspection.

FIG. 1 illustrates a securing device 10 according to an embodiment. The securing device includes a processor 100, communication unit 110, mechanisms 120, power source 140, and memory 130. The Processor 100 is associated with programming logic 150, unlocking logic 160, and tracking logic 170. The memory 130 is associated with unlock code or codes, and a programmable bag tag 44 (optional). The power source 140 may be a battery or wireless antenna energized by an external scanning device.

The processor 100 enables the securing device 10 to operate with various types of logic or programming and manipulate the contents of memory 130. Communication unit 110 enables the securing device 10 to interact with external systems, such as a travel carrier system or a traveler's smart phone, to receive updated logic or unlock codes 12.

The programming logic 150 enables the securing device 10 to be programmed with various unlock codes 12, enabling the securing device 10 to be responsive to new and updated unlock codes 12 according to how the securing device 10 happens to be programmed. In an embodiment, a travel carrier has a transmitter that wirelessly programs the securing device 10, via the programming logic 150, to accept an unlock code 12. In another embodiment, a traveler carries a smartphone running an app that wirelessly communicates with the securing device 10 and, via programming logic 150, programs unlock codes 12 into the securing device 10. Such unlock codes 12 are stored in memory 130.

The unlocking logic 160 is operable to unlock the securing device 10 in response to receiving an acceptable unlock code 12. In an embodiment, the unlocking logic 160 compares a received unlock code to an existing (e.g., pre-programmed) unlock code 12 stored in memory 130. Upon detecting a match, the unlocking logic 160 directs the mechanisms 120 to mechanically unlock the securing device 10.

The tracking logic 170 keeps track of the passage of time and the usage of unlock codes 12, including when unlock codes 12 are programmed into the securing device 10, when candidate unlock codes 12 are transmitted at the securing device 10, and when a matching unlock code 12 is used in the securing device 10. Such logic enables the securing device 10 to use temporary unlock codes 12 that expire, such as with the passage of time, or when the unlock code 12 is used one or more times corresponding to a one-time unlocking or a multi-use limited unlock code 12.

The securing device 10 provides functionality that enables various methods. The securing device 10 is available for use by travelers as securing device 10 designed to be applied to an individual piece of airline luggage (to a "bag"). In an embodiment, the securing device 10 has a securing feature (mechanisms 120) controlled by two or more implementations. The securing feature, provided by mechanisms 120, is capable of being unsecured ("unlocked") through an unlocking mechanism assigned to the securing device 10, by the manufacturer or by the owner of the lock (e.g., the traveler). The unlocking mechanism may be physical or non-physical (e.g., electronic). The non-physical mechanism comprises transmission of the unlock code 12 (an electronic combination, token, or code) through wireless implementations such as Bluetooth, use of a phone app or application, radio frequency identification (RFID), near frequency communication, or other wireless technology. Such communication is received by the communication unit 110 and interpreted by the various logic of the processor 100 to cause the securing device or mechanisms 120 to unlock the securing device.

In an embodiment, the securing device 10 includes a physical mechanism, among mechanisms 120, that unlocks the securing device 10 through direct physical interaction with a physical key or physical combination. The additional locking device, electronic or physical in nature (by key or combination), may be incorporated as a secondary lock in the described locking device or as a second locking or securing feature associated with a bag. In this way, the embodiment may be coupled with a method of unlocking the securing feature by physical key or application of combination to unlock the securing device or feature of the bag.

In an embodiment, the unlock code or codes specific to the bag that is locked (i.e., traveler-secured baggage) with the securing device 10 are conveyed by the traveler to the carrier and subsequently matched or affixed to the bag (e.g., via a bag tag) when the traveler deposits the bag (e.g., at bag drop) for conveyance to its destination. The travel carrier 20 is then able to use the unlock code 12 to unlock the securing device 10 of the bag when or if the bag is opened for inspection. In another embodiment, the traveler produces a digital identity to the carrier, and the carrier derives the unlock code or codes from the digital identity of the traveler. The unlock codes may be derived based on a token, hash, or equivalent derivation that obfuscates the original digital identity. The travel carrier 20 matches or affixes the unlock code or codes to the bag via a bag tag or other programming technique.

The traveler uses mobile device 4, which runs a smartphone app 24. The smartphone app 24 allows the traveler to program the securing device 10 with an unlock code or codes. In an embodiment, the traveler purchases a securing device 10, and initially programs the securing device 10 with the traveler's chosen unlock code. The securing device 10 is then responsive to unlocking itself when provided with the programmed traveler's chosen unlock code. The traveler also configures the securing device 10 with another unlock code 12 intended for use by the travel carrier 20 when unlocking a checked bag (e.g., a bag already dropped off) that is to be inspected. Such an unlock code 12 can expire after a set time following bag drop, or can serve as a one-time use which causes the unlock code 12 to become disabled once the bag is unlocked for inspection (in which case, the remaining traveler's chosen unlock code remains to unlock the bag). In another embodiment, the traveler uses the mobile device 4 to generate a token, hash, or equivalent, based on the traveler's digital identity that is provisioned on the mobile device 4. The traveler then uses the mobile device 4 to program the securing device 10 using the token etc. as the unlock code or codes.

An embodiment of the securing device 10 is designed as a securing device with a securing feature controlled by a non-physical approach to program lock or unlock codes associated with the traveler, and provide the unlock codes 12, directly or indirectly, to travelers. The securing device 10 can include indicia to convey that the lock is "recognized" or "accepted" by the TSA, as a type of lock the TSA screeners will not break if additional bag screening is to be performed. The indicia are recognizable by the TSA screeners, so they are also aware to take notice of the securing device and employ use of a corresponding scanning device or scanner capable of communicating with the communication unit 110 of the securing device 10 to unlock the securing device 10. The term "indicia" is a broad term and can include the appearance of the securing device 10 itself (or the securing device having separate indicia associated therewith). The indicia, in an embodiment, is a distinctive (and in an embodiment, a suitably conspicuous) physical characteristic such as shape, color, design, texture, weight, or other characteristics that makes the indicia or securing device 10 instantly recognizable by individuals working for the bag screening authority who are specifically trained to recognize such characteristics. Alternatively, a distinctive chemical or electronic characteristic can serve as indicia, including any distinctive characteristic that can be instantly recognized by persons looking for such indicia.

Like a mechanical combination lock, the securing device 10 can be electronic and programmed to accept at least one unlock code 12, and in an embodiment, at least two unlock codes 12. A first unlock code 12 is for use by the bag owner, and the second unlock code 12 is for use by the entity (such as a travel carrier) to unlock the securing device 10 to allow bag inspection when the bag is away from the owner. The securing device 10 also is capable of being programmed by a user or traveler with at least one customized specific unlock code 12. The customized specific unlock code 12 enables the traveler to maintain full situational awareness of the bag and ability to unlock the securing device 10 at will. Furthermore, the other unlock code 12 to which the travel carrier has access enables, when the bag is in the travel carrier's control, the bag to be diverted to and presented unlocked for TSA inspection or security screening. Afterward, the bag is locked and returned to the air carrier's control and eventual traveler pickup or retrieval at the travel destination.

Figure 2:
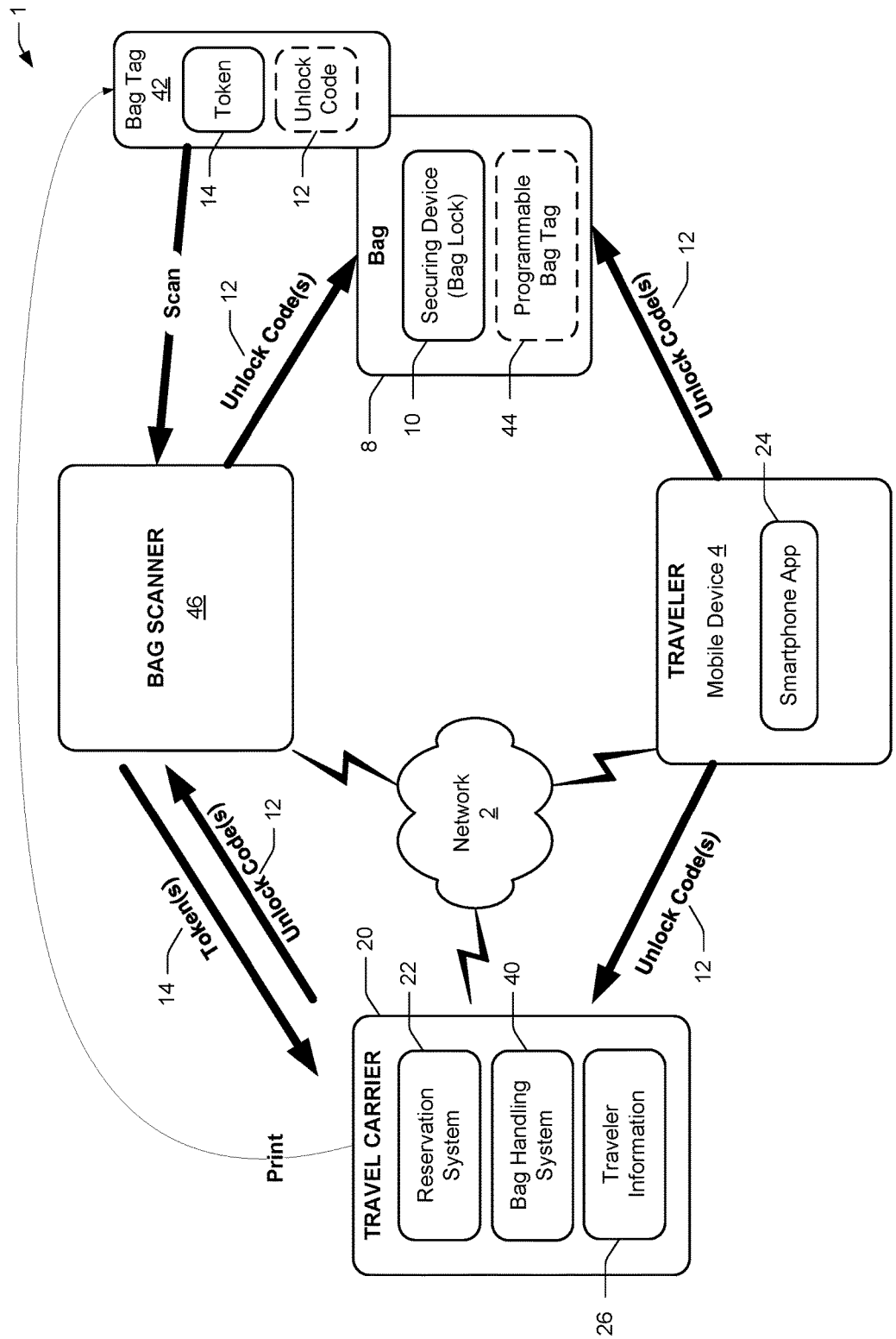
FIG. 2 illustrates a securing device system according to an embodiment.

FIG. 2 illustrates a securing device system 1 according to an embodiment. The travel carrier 20 is in communication (via network 2) with bag scanner 46, operating as a bag unlocking system of a bag handling system, and a mobile device 4 of a traveler. The bag scanner 46 communicates with the bag 8.

The travel carrier 20 includes a reservation system 22 (e.g., with which the traveler books travel reservations and optionally provides an unlock code 12), a bag handling system 40, and traveler information 26 (e.g., a profile of traveler information, which in embodiments, includes the unlock code or codes corresponding to a bag 8, or more than one bag 8, of the traveler. The travel carrier 20 prints the bag tag 42 for the bag 8.

The travel carrier 20 receives the unlock code or codes from the mobile device 4. In an embodiment, the travel carrier 20 stores the unlock code or codes with traveler information 26 that is received when the traveler books travel reservations. The traveler drops off the bag 8 at the bag handling system 40, e.g., during a bag drop process at which time the travel carrier 20 generates and prints the bag tag 42 and attaches the bag tag 42 to the bag 8.

The bag 8 includes a securing device 10 responsive to the unlock codes or codes. In an embodiment, the bag 8 also includes programmable bag tag 44, which is electronically programmed as an optional implementation of the bag tag 42. In other embodiments, the programmable bag tag 44 is included as part of the securing device 10. The securing device 10 or the programmable bag tag 44 can be integrated into the bag 8.

Bag scanner 46 reads the bag tag 42 (or programmable bag tag 44) of the bag 8, such as when the bag 8 is undergoing the bag drop process, and when the bag 8 is routed throughout the bag handling system 40. The bag scanner 46 scans or reads the bag tags and provides unlock codes 12 to the securing device 10. In an embodiment, the bag scanner 46 retrieves the unlock code 12 directly from the bag tag 42. In another embodiment, the bag scanner 46 reads the token 14, passes the token 14 to the travel carrier 20, and receives the unlock codes 12 corresponding to the token 14.

The smartphone app 24 running on the mobile device 4 integrates with travel carrier systems, e.g., to program the bag unlock codes 12 into the securing device 10. In an embodiment, the smartphone app 24 communicates to the travel carrier 20 systems to provide the bag unlock code 12 to the travel carrier 20, which matches the bag unlock code 12 to the reservation of that traveler. The smartphone app 24 and travel carrier 20 systems can communicate bi-directionally. In an embodiment, when exchanging information from the travel carrier 20 to the smartphone app 24 (e.g., travel carrier 20 sends a standardized or suggested bag unlock code 12, such as a carrier frequent flier number or other specific traveler number, to the traveler's smartphone app 24 which then programs the securing device 10 with the suggested unlock code 12). In another embodiment, when exchanging information from the smartphone app 24 to the travel carrier 20, the travel carrier 20 (e.g., the reservation system 22 of the travel carrier) requests a bag unlock code 12 from the traveler, and queries the traveler's smartphone app 24 to automatically download from the smartphone app 24 whatever unlock code 12 the traveler approved in the smartphone app 24 to be shared with the travel carrier 20 as the temporary 'master' unlock code. In an embodiment, the unlock code 12 to be retrieved from the smartphone app 24 is generated as a token, hash, or equivalent that is associated with or derived from the traveler's digital identity. The digital identity may be accessible to the smartphone app 24, because the digital identity has been provisioned to that smartphone and the traveler has granted permission to the smartphone app 24 to access the digital identity.

In greater detail, there are generally two opportunities, prior to ingestion of the bag 8 into the bag handling system, for the traveler to initially provide the lock or unlock code 12 to the entity that unlocks the bag by applying the unlock code to the securing device. The first is at time of travel reservation (ticket purchase) and the second is when the bag is provided to the carrier (check-in, and bag drop). These opportunities may be temporally separated in time or take place at the same time. In an embodiment, these opportunities arise through the reservation of a ticket for a future travel opportunity, and the subsequent check in with the carrier for the boarding of the conveyance. These two events may take place months or years apart or within seconds of one another.

Reservation systems may be directly carrier controlled. Reservation systems also may be third-party controlled, which feed reservation data to the carrier reservation system. Accordingly, an embodiment adds an additional data set to the information received by the carrier reservation system, in order to associate the unlock code of a securing device with the profile within the reservation attached to the bag tag of the bag to be conveyed (i.e., the information on or within the tag of the bag). The profile may be of the traveler with whom the bag will be associated, or of the bag itself. Also, the profile attached to the bag tag will associate the physical bag with the party that owns the bag or is responsible for the bag (generally the traveler that has made the reservation and "checked" the bag). An aspect of the embodiments ties the unlock code of the securing device of the bag (may also be referred to as bag unlock code) to the reservation code. The bag unlock code works with one of the bags tied to the trip. The unlock code is tied to a bag tag, the bag tag has the reservation and traveler information or identifier. An embodiment adds the unlock code to the bag tag (encoded or encrypted), or identifies (e.g., performs a lookup to retrieve) the unlock code by using the traveler information on the bag tag. Another embodiment derives the unlock code from a digital identity of the traveler, enabling the travel carrier (who has access to the digital identity information provided by the traveler) to use the unlock code to lock and unlock the securing device of the bag, whether for check-in aspects or pick-up aspects of travel. For check-in, the travel carrier may identify and divert bags for secondary screening inspection, and use the unlock codes derived from traveler digital identities to unlock the bags before handing over the bags unlocked for inspection. For pick-up, the travel carrier may identify bags for secure pick-up, and divert such bags to automated or attended secure pick-up areas. The travel carrier may hold such bags until a traveler presents a digital identity (or matching token) corresponding to the digital identity or token used when the bag was dropped off.

In another embodiment, multiple unlock codes (e.g., two or more) are assigned to a reservation, which can be done when the traveler books via the online flight reservation or profile. When the flight reservation system asks for a frequent flyer number, the flight reservation system is able to store or provide the unlock codes within the reservation system. The system can present information identifying the bag or bags to be brought on that flight, and present the unlock codes tied to the bag or bags.

In yet another embodiment, travelers do not need to provide unlock codes during the travel reservation process. Instead, the travel carrier matches the traveler's digital identity to a travel reservation, and tracks the traveler and their bag at drop off. The carrier generates an unlock code and associates that unlock code with the traveler's digital identity or travel reservation. The carrier may generate the unlock code randomly, or may derive the unlock code from the traveler's digital identity. The unlock code may be encoded into the bag tag. In another embodiment, the unlock code is stored at a back end of the travel carrier, and associated with a token or lookup code that is encoded into the bag tag. The travel carrier can then read the bag tag, extract the token or lookup code from the bag tag, and use the token or lookup to retrieve and use the stored unlock code from the back end. The unlock code can be applied to or programmed into the securing device of the bag at the time of bag drop off, because the traveler uses their digital identity to make the travel reservation, and then uses their digital identity again to drop off the bag at the time of check in. Associating or deriving the unlock code from the traveler's digital identity eliminates a risk of the traveler mixing up or forgetting manually-provided unlock codes. Rather, in such embodiments, the same digital identity is used for locking or unlocking the securing device of the bag. Accordingly, the traveler does not need to organize or remember unlock codes for their bags, and the traveler does not need to come up with an unlock code. The traveler presents their digital identity when making travel reservations, and when checking or picking up bags.

For travel reservations, in an embodiment, the traveler's digital identity is a mobile driver's license (mDL), and the travel carrier's reservation system interacts with the traveler (e.g., via a website, kiosk, or attended reservation desk) to request the release of an identity dataset or identity information from the traveler's mDL. The traveler approves the request to release identity information. The travel carrier's reservation system uses the identity information to automatically populate fields of the reservation form requesting traveler information. The traveler may choose to manually enter their identity information into the travel carrier's reservation system. The travel carrier may generate an unlock code and associate with code with the traveler's identity information as received. The travel carrier may generate the unlock code based on the traveler's identity information, whether automatically received from the mDL, or manually provided by the traveler. Because manual data entry can be subject to user error, the automated approach using the mDL helps avoid the risk of manual user errors.

In an embodiment, bag drop off is automated. The traveler uses a digital identity such as an mDL to establish their identity to the travel carrier, and to establish that their identity corresponds to the traveler who is dropping off the bag. The travel carrier may generate a paper tag to be placed on the bag, including a tracker number or other tracking technology (e.g., RFID) embedded in the tag. In other embodiments, the travel carrier may program the tracking number into an electronic tracker, such as an RFID bag tag, that may be added or integrated into the bag for bag tracking purposes. The travel carrier encodes the unlock code into the bag tag or electronic tracker associated with the bag. The traveler may use their digital identity, such as their mDL, to generate an unlock code (derived from or otherwise associated with or tied to the traveler's digital identity information) that is used to lock the bag. The traveler may then generate an anonymous token corresponding to the unlock code or digital identity. The travel carrier may encode the token into the bag tag that is associated with the unlock code. The travel carrier may read the bag tag, extract the token, and use the token to look up and retrieve a corresponding unlock code from a travel carrier back end. Thus, the travel carrier unlocks the securing device of the bag in response to presentation of that mDL or digital identity information presented when the bag was dropped off and locked. Use of the token enables the travel carrier to lock and unlock the bag, without the traveler needing to give their digital identity information to the travel carrier, keeping the traveler's mDL information safe.

Embodiments support online and offline bag locking and unlocking. An offline embodiment involves providing a token that is encoded into a bag tag attached to the bag or programmed into the bag, and which is available for scanning or reading by baggage routing systems. The token may be used to derive the unlock code directly, without needing to obtain authentication, such as from an authorizing source. In an embodiment, the token is an encrypted code that a reader may decrypt to obtain the unlock code for that bag.

An online embodiment involves accessing the unlock code through the use of an authorizing source or other entity. In an embodiment, a travel carrier reads the traveler's digital identity to retrieve a token, corresponding to the traveler's identity or travel account information. The travel carrier sends a copy of the token to a commercial entity, such as a security provider or a server operated by the travel carrier. The travel carrier also sends a copy of the token to an authorizing source, such as an issuer of the traveler's digital identity (e.g., a Department of Motor Vehicles). The commercial entity and the authorizing source then compare tokens, and upon matching, the authorizing source verifies that the transaction is trusted and authorizes the commercial entity to release to the travel carrier the unlock code corresponding to that traveler's digital identity. Here, the token passes from the digital identity to the travel carrier for that bag, and then the travel carrier matches the token to the authorizing source, and retrieves the unlock code. In embodiments, the DMV or other issuer of identities can serve as a trusting source. The travel carrier also can issue and use its own form of identity, such as a frequent flyer account, and such a travel carrier online system can serve as the authorizing source performing the authorization in this online context. Thus, the travel carrier may serve as the authorizing authority that matches the token read from a bag tag against the passenger identity as stored by the travel carrier's online system. In other embodiments, the travel carrier may also rely on other authorizing sources or authorizing authorities, by virtue of using tokens that can be matched or exchanged by other authorizing sources or authorities performing such serves for the travel carrier, independent of the underlying traveler digital identity information.

In another online embodiment, bag security involves a data file for tracking security details of the bag. The travel carrier, or other entities involved in verifying tokens or bag unlock codes (e.g., authorizing source or authorizing authority, bag scanners, etc.), may generate and update a data file used to indicate actions such as those related to transportation or unlocking of the bag. In an embodiment, the travel carrier stores the data file in a back end server. In other embodiments, the authorizing authority stores a version of the data file. The data file tracks and indicates various events, such as whether the digital identity information and corresponding token presented by a traveler attempting to pick up a bag matches the token generated when the bag was initially dropped off or locked. The data file tracks whether and when the bag was unlocked or opened, e.g., for enhanced security screening. The data file tracks whether verification of an online transaction was carried out to verify the traveler's identity when opening the bag. Embodiments use the data file to track such details, and can use the data file to log exactly what events occurred relating to the bag, such as when the securing device of the bag was opened and how often, as well as any other information for purposes of tracking custody and ensuring that the bag was not improperly handled or unnecessarily opened. The data file also can be used to verify that the bag was not even opened between drop off and pick up.

Embodiments would not disrupt or burden existing check-in or drop-off systems. Embodiments that automatically lock or unlock, or that do not test or reassign codes in a manner that is disruptive to the check-in process, enable check-in or drop off systems to proceed smoothly while not causing travelers to perform time-consuming steps during check-in. However, it is beneficial for the system to verify that the unlock code that was provided at reservation matches the unlock code of the bag being dropped off (note that a bag can have multiple unlock codes, e.g., an owner unlock code, a guest unlock code, a child or spouse unlock code, a temporary or master unlock code, a valet unlock code, etc.). The last opportunity for association of the unlock code of the bag securing device by the carrier under whose control the bag will be when inspection is performed, is at the point in time when the bag is released from the traveler's control to the carrier. Check-in or drop-off time is the last opportunity a traveler will interact with their bags, such as changing the bag unlock code (e.g., via a smartphone app or physical interface of the bag). An embodiment of the system is not encumbered with asking the traveler to provide, enter, or update their specific lock or unlock code to verify the bag's unlock code at the time of check-in or drop-off. Quick and efficient ways are employed to confirm the bag unlock code at the time of check-in or drop-off. In an embodiment, the unlock code is derived from the traveler's digital identity, and the traveler does not need to manually enter or remember a specific unlock code. Rather, the traveler presents the digital identity (e.g., via a smartphone app) to program the unlock code into the securing device, or to unlock the securing device. In an embodiment, the traveler presents the digital identity to the travel carrier or other entity that derives the unlock code or programs the securing device with the derived unlock code on behalf of the traveler.

In some embodiments, the traveler may create their own unlock code and manually program a securing device with the unlock code, and may provide that selected unlock code to the travel carrier at the time of making travel reservations (e.g., potentially long before the time of travel). The travel carrier may eventually unlock the bag at the time of travel, if the bag is selected for secondary screening. However, as time passes after making travel reservations and providing an unlock code to the carrier, human nature may potentially cause the traveler to change the unlock code, or even change which bag (having a corresponding securing device) the traveler ultimately presents at the time of travel and bag check. Despite the traveler's intentions at the time of reservation when providing an unlock code to the carrier in such embodiments, the traveler ultimately may travel with a different bag or securing device. The different bag or securing device is transferred to the carrier at the time of check-in or at the transfer of possession of the bag from the traveler to the carrier. In this situation, the unlock code or codes the traveler initially provided to the carrier (at the time of carrier reservation), no longer corresponds to the unlock code or codes actually used with the bags that are dropped off at check-in or drop-off. It is the nature of modern travel that significant time may pass, between placing the reservation for a trip or flight (at which time the traveler would provide the unlock code to the carrier), and actually taking the conveyance or trip. In embodiments, it does not matter if the traveler has forgotten the unlock code at bag drop-off. It does matter if the carrier has unlock codes that will not unlock the securing device of a bag dropped off with the carrier. This can happen if the traveler has changed the unlock code accepted by the securing device, so that the unlock code provided at reservation will no longer unlock the securing device, or if the traveler transfers to the carrier a bag having a different securing device (likely a different bag). Various embodiments described herein address this issue by using carrier-generated unlock codes, or digital identity derived unlock codes. The carrier can encode such codes in the bag tag, thereby ensuring at bag drop off that the carrier has verification that the carrier-held unlock code will secure or unlock the securing device associated with a bag. The unlock code generated by the travel carrier may be a random code or may be associated with the traveler's carrier identification number, travel reservation number, booking reservation number, or other alphanumeric number associated with the conveyance of the traveler or bag. In embodiments, unlock codes may be associated with such numbers by deriving from the numbers a token, hash, or equivalent, to serve as the unlock codes.

An embodiment of a carrier system can be designed so that the traveler provides the unlock code at the time of making a reservation. If the traveler dislikes, forgets, or otherwise does not want to use the code provided at the time of making the reservation, then the carrier system can be used to update or change the unlock code at the time of flight check-in or bag drop-off. The carrier system can check whether the unlock code that was previously provided at reservation matches with the bag actually being checked. This system check can address situations where, e.g., the traveler has decided to bring a different bag that has code different from the code of the other bag whose code was entered at reservation. It can also serve as a reminder to the traveler as to a code the traveler can use to unlock his or her own bag. The carrier system updates the unlock code as needed, to ensure the carrier has an unlock code that can be used to unlock the bag. In an embodiment, the carrier system programs the bag securing device with an unlock code derived from the traveler's digital identity.

To recap, in an embodiment, the traveler provides the bag unlock code at the time of flight reservation to the carrier. The traveler may provide the unlock code at the carrier's flight reservation web site, e.g., when providing other traveler details requested by the carrier reservation website as part of the travel reservation process. The traveler enters an unlock code of the securing device into a data entry field of the carrier reservation website. In an embodiment, the securing device and/or the data entry field may default to a standardized KTN number, airline frequent flyer number, etc. Thus, the entered unlock code is treated as another piece of traveler information that travelers provide to the carrier at reservation. Subsequently, at the time of check-in, the carrier reservation system confirms the unlock code, e.g., by verifying the same code that was provided at the time of reservation, or by changing or otherwise updating the code to a new code, e.g., per traveler choice or as derived from the traveler's digital identity. The carrier system then generates the bag tag encoded with the unlock code or tokenization of the unlock code, which is attached to the bag to identify the bag.

In an embodiment, at bag check-in the carrier can request or verify the traveler's bag unlock code (for the securing device). In another embodiment, the carrier can notify the traveler and request traveler approval to apply a carrier-generated (e.g., as derived from the traveler's digital identity) or carrier-suggested unlock code. The system can remind the traveler to add such unlock codes to the bag, or can automatically program the securing device with such unlock codes. By way of efficiency, the travel carrier can then provide a QR code that the traveler can scan or read using a smartphone app. The QR code contains the encoded unlock code. The traveler can scan or read the QR code to retrieve the suggested unlock code, and use that scan-obtained unlock code to program the bag (e.g., via a smartphone app to program the securing device). In an embodiment, at check-in, the carrier check-in system shows the traveler the code or codes associated with the bag (e.g., three proffered codes), and prompts the traveler to keep or change the code or codes.

The carrier system can use, or prompt the traveler to use, a master bag unlock code, which is separate from the traveler's chosen bag unlock code. The master bag unlock code can be system-generated, and can be temporary so that it expires after a given duration. In another embodiment, a master bag unlock code is temporary and is the airline code tied to the reservation for that traveler. The securing device is programmed so that the traveler has their own customized and specific code to unlock the securing device. The securing device can be unlocked with a temporary master code that expires, unlike current physical systems relying on permanent physical master keys.

A bag has attached to it a bag tag, to identify the physical bag with the traveler or traveling profile which the bag will follow. The bag tag can be on-board (integrated with) the bag, or attached externally to the bag. Currently there is no consensus on how to implement RFID on bag tags. An embodiment involves a paper tag with RFID capability, with the RFID inside the paper similar to existing loss-prevention security tags (similar to those loss-prevention tags encountered in a shopping store, used for security tagging of items at risk of theft). The bag tag can also be integrated into the baggage.

The bag tag may electronically store the securing device unlock code (such as a master unlock code, or a temporary unlock code) in the "tag" information. The electronically tag-stored codes are usable (e.g., by a scanner or other unlocking device) to electronically unlock the bag. In an embodiment, a scanner can read (optically or electronically) the bag tag, extract the unlock code from the bag tag, and generate an electronic signal to transmit the unlock code to a securing device. The securing device verifies that the electronic signal corresponds to a valid unlock code with which the securing device has been programmed, and if so, the securing device unlocks.

Various implementations are used to store the unlock code (e.g., encode the unlock code in a bag tag) while not revealing what the code is, unless read or scanned by a scanner designed to extract the tag-stored unlock codes. In an embodiment, the securing device unlock code is printed on the tag (e.g., in an encrypted version or an otherwise obfuscated version), so the electronic bag tag scanner or reader reads the tag, extracts the unlock code, and uses the unlock code to unlock the securing device. In an embodiment, the bag handling system prints the tag with encoded unlock code, or prints the tag for visual check and electronically encodes an RFID included in the tag, thereby effectively "printing" the code into the RFID tag. Thus, simply affixing such a bag tag to the bag also adds the unlock code to the bag, encoded, to enable the carrier to unlock the securing device of the bag for inspection. Embodiments also may add the unlock code to the bag by programming or otherwise associating an integrated electronic or RFID tag, containing the unlock code, internal to the bag.

Other embodiments do not store the securing device unlock code in the bag tag. The unlock code is stored on a remote server, e.g., a server operated as a back end by the carrier. The bag tag has an identifier or token (e.g., traveler reservation code, or other identifier including those currently in use to track bags). The reader reads the identifier or token and queries the airline or carrier server using the identifier or token to look up the server information for the bag, including a bag unlock code to open the securing device of the bag. The server passes the unlock code to the reader, which uses that code to unlock the securing device of the bag.

In an embodiment, the unlocking of the secured bag may be performed using a technique similar to how a mobile driver's license (mDL) system verifies entities requesting mDL source data from an issuing authority of the mDL (this capability is known as an "online transaction"). Embodiments can perform verification using a token associated with the mDL (or digital identity) credential to serve as the unlock key to the secured bag, and not the mDL credential itself (or the personal information contained within the mDL data). The associated traveler to whom the mDL and baggage belong, will have a traceable data stream of when the online transaction to unlock the bag was performed, based on the verifications or other interactions between the travel carrier back end, travel venue kiosks, bag scanners, issuing authorities of the mDLs, and other communications.

Embodiments also enable the token to be delivered in an offline system or offline transaction, where the travel carrier receives the token associated with the mDL at reservation or check-in, and the travel carrier uses the token to open the securing feature of the bag before the bag is delivered for inspection, without needing a check-back to the issuing authority.

The carrier can determine whether to have the unlock code encrypted or encoded onto the tag as described above, or can use a lookup to access the unlock code stored on a server, by using the traveler profile information associated with the bag tag to access a database containing traveler records and look up the unlock code in the database, and transmit the unlock code to an unlocking device after the carrier system has identified the bag for inspection and made a request for the code to unlock that bags securing device.

Also, an embodiment prevents the airline system from being able to change the bag unlock code ("recode"), ensuring that the traveler has such an ability to recode. The carrier will have the capability to unlock the bag using the unlock code made available by the traveler (which code has been programmed into the bag by the traveler, or which code is otherwise assigned to the bag).

Embodiments can use a standardized unlock code (e.g., as the primary or master or secondary unlock code), such as a traveler number (frequent flyer number) or KTN (known traveler number i.e. TSA number), as the bag unlock code.

Embodiments can allow the traveler to add, or prompt the traveler to add (e.g., via a kiosk check-in prompt), such a standardized code into the bag at check-in or drop-off. In an embodiment, the kiosk can email or display the traveler number (e.g., in plain text or via QR code or other), and the traveler can relay that number to a smartphone app (e.g., by manually typing or by using the smartphone to visually capture the QR code or other encoded version of the unlock code). The smartphone app then directs the smartphone to program the bag securing device, e.g., by directing the smartphone to use its Bluetooth, RFID, Wi-Fi, or other built-in transmission capabilities to communicate the unlock code from the smartphone to the securing device, along with instructions authorizing the securing device to accept the programming from the smartphone.

In another embodiment, the traveler can authorize the carrier to program the bag with a new unlock code, e.g., at the check-in kiosk or when placing the bag on the scale at bag drop-off, or other options that allow the traveler to authorize another system to program the securing device, through near-frequency wireless communication or other short-range forms of electronic information exchange. In an embodiment, the traveler presents digital identity information to the carrier, and the carrier derives an unlock code from the traveler's digital identity, and programs the securing device using the derived unlock code. In another embodiment, the traveler authorizes the carrier to derive the unlock code using the traveler's digital identity information as already presented earlier when making travel reservations via the carrier's reservation system or website.

In an embodiment, the airline will lock the securing device for the traveler. The traveler keeps the unlock code. The carrier system would confirm that the carrier has the right unlock code, by ensuring that the securing device unlock code is known by the traveler at check-in or drop-off, whether the unlock code was specified by the traveler at reservation and verified at check-in or drop-off, or was programmed last-minute, right at the time of check-in or drop-off. The system to apply or verify the unlock code with the securing device thereby avoids burdening or encumbering the check-in process.

A variety of implementations can be used to associate a bag unlock code to a traveler. The travel carrier system can link a bag unlock code to a biometric record such as a facial scan of the traveler and encode the lock with that code responsive to confirming the facial scan or other biometric record. In an embodiment, the unlock code is derived (e.g., by using a hash operation or other algorithmic transformation) from the biometric record itself. Various approaches are available to efficiently and quickly encode the lock with the new code, such as with current electronic locks that use smartphone apps.

The unlock code is used to unlock the securing feature of the bag, when or if the bag is to be opened for inspection. An inspecting entity retrieves the unlock code by utilizing a scanning device that can detect the bag tag that is encoded with the unlock code, and transmit the unlock code to the securing feature, causing it to unlock.

As for physical equipment implementation, the bag tag readers (as used by agents or automatic bag routing systems) would include a transmit function to unlock the electronic securing devices. Such transmit functionality is likely already available in off-the-shelf readers. In an embodiment, a travel carrier deploys a mix of receive (RX) or receive/transmit (RX/TX) readers for scanning bag tags. Such functionality may include the ability to communicate electronically with securing devices to transmit bag unlock codes to the securing devices. In an embodiment, employees in a bag inspection station carry handheld scanners that scan or read and unlock securing devices. In another embodiment, fixed scanners (such as a baggage handling scanner) scan or read and unlock (or re-lock) bags as they pass into (and out of) a bag inspection station.

A further aspect of implementation is the scanning devices or readers can include the ability to decrypt or decode. In an embodiment, the reader scans or reads the bag tag including an encrypted master bag unlock code, and decrypts the encrypted master bag unlock code. The reader transmits, as a local signal, the decrypted master bag unlock code to the securing device to unlock the bag. In another embodiment, the reader scans or reads the bag tag including a reservation identifier or other lookup token, transmits the reservation identifier to a database as a master bag unlock code request, receives a response including a master bag unlock code corresponding to the reservation identifier, and transmits as a local signal the master bag unlock code to unlock the bag. In an embodiment, at check-in, the system prompts the traveler to confirm the number of bags being checked, and also provides information about which codes are on the bags, and prompts the traveler whether to keep the unlock codes. For example, the system prompts: "Do you want to keep these codes, Yes/No?"

The scanning device may be utilized directly by the inspecting entity, or the scanning device may be incorporated into the cargo system used to track and route bags. Accordingly, embodiments may use an automated process to scan or read the bag, detect the unlock code, and transmit the unlock code to the securing feature to unlock the bag, before presentation of the bag to the inspecting entity. In an embodiment, after release from inspection, the utilized unlock code is rendered obsolete or unusable, thus protecting the securing feature or securing device of the bag from being opened again with the same unlock code, fulfilling the traveler's expectation of personal security. The unlock code may be rendered obsolete automatically through the use of temporary unlock codes that expire, by programming the securing device to stop using the unlock codes, or by directing a back-end system to no longer provide unlock codes in response to unlock code requests for those codes rendered obsolete.

In an aspect of the invention, by way of a front-end process, the traveler provides a bag unlock code to the carrier, and the carrier passes that code to the scanning device for opening the bag (if the bag is selected for opening or screening). The code information that gets passed between carrier and the entity unlocks the bag for inspection.

In another aspect of the invention, by way of a back-end process, the unlock code information is carried by the bag itself by way of the bag tag through being printed or otherwise encoded within the bag tag that is attached or transmitted to the bag at the bag drop where the traveler deposits the bag for conveyance to a destination. The unlock code is identified or received from the bag tag by the scanning device, and subsequently transmitted to the securing device to unlock the securing device.

Figure 3:
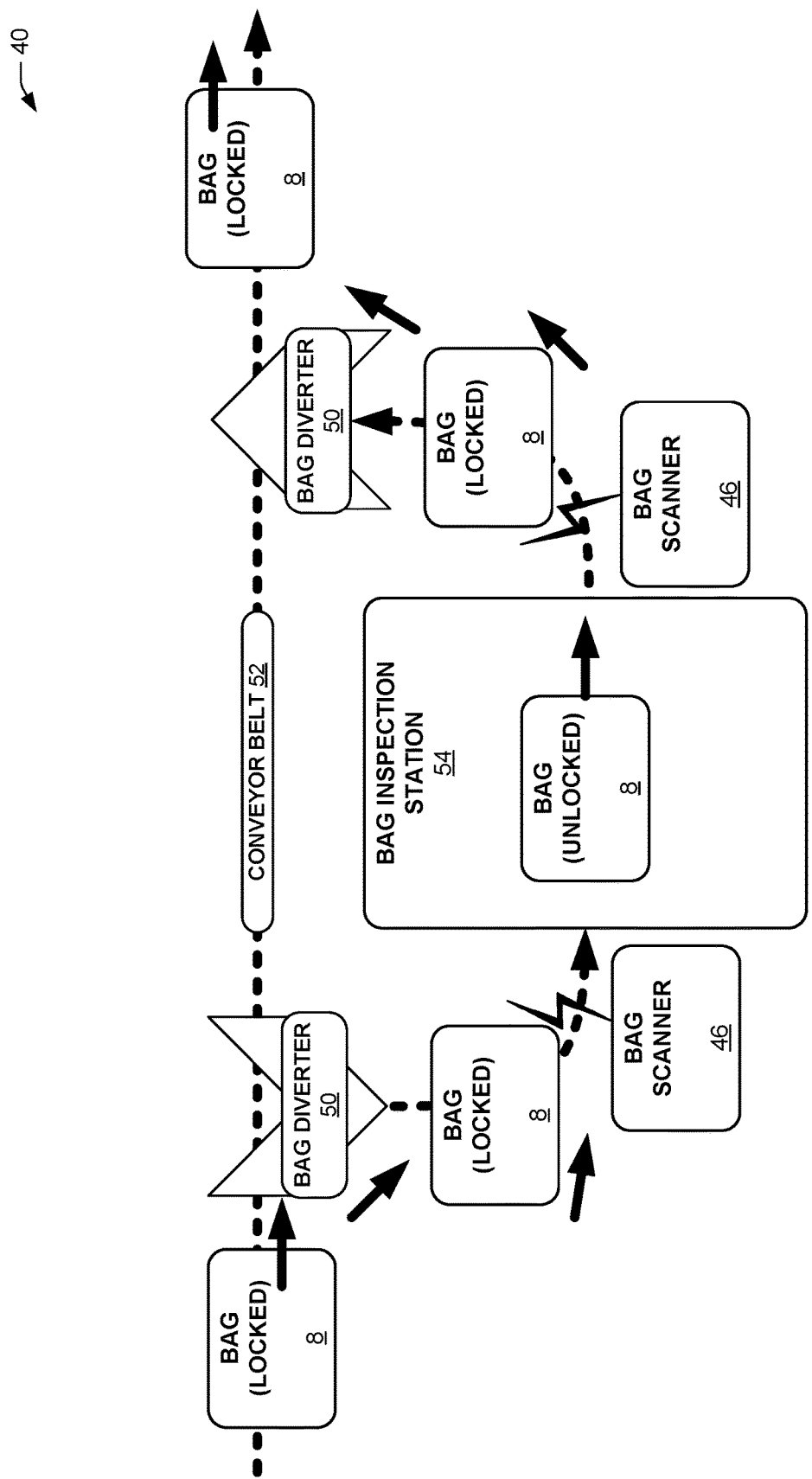
FIG. 3 illustrates a bag handling system according to an embodiment.

FIG. 3 illustrates a bag handling system 40 according to an embodiment. Multiple bags 8 are shown progressing along various stages of a conveyor belt 52, including bags diverted by bag diverter 50 past bag scanners 46 through the bag inspection station 54. The bags 8 remain locked, and are unlocked when at the bag scanner 46 at the bag inspection station 54 prior to the bag being passed inside, at which point the bags are unlocked. In an embodiment, the unlocked bag 8 is manually re-locked and returned to the conveyor belt 52. In another embodiment, the unlocked bag is returned unlocked to the conveyor belt 52, and the bag scanner 46 re-locks the bag upon exiting the bag inspection station 54.

In another embodiment, the inspecting entity (the bag inspection station 54 and its employees) does not receive the unlock code, because the unlock code is transmitted to the bag by way of a scanning device (e.g., bag scanner 46) that is operated by the travel carrier, or a facility operator on behalf of the travel carrier (such facility operator also referred to herein as travel carrier). By way of example, the travel carrier can be an airline, bus or train passage provider. The airport, bus, depot or train station can be owned publicly, privately or through a public or private partnership with the facilities operated on behalf of the public that travel through the private operators, or that convey people and goods (bags) to and from the facilities. Example facilities of these types are, Hartsfield-Jackson Atlanta International Airport, Washington Dulles International Airport, Union Station in the District of Columbia (Washington, D.C.) and Pennsylvania Station in New York City.

Another embodiment involves a system that automatically unlocks bags before delivering the unlocked bags to inspectors at the bag inspection station 54, as illustrated in FIG. 3. This embodiment does not rely on agents or hand-held scanners or readers to unlock the bags. This embodiment removes the agent unlockers, and the hand-held scanners or readers used by such agents, from the unlocking aspects of the securing devices. In an embodiment, the majority of airports worldwide use a barcode scanner or reader to track bags. The IATA (www.iata.org) and some airport-related companies have created standards to simplify the connection of hardware and software used on airports. Some standards used are: Common Use for Terminal Equipment (CUTE), Common Use for Passenger Processing Systems (CUPPS), and Common Use for Self Service (CUSS) kiosks. Such standards enable the positioning of the bag scanner 46 at entry or exit of the conveyor belt 52 through the bag inspection station 54. Some airports are beginning to integrate RFID readers into these barcode scanners or readers, although RFID readers are not in common usage.

Note that the airport or other back-checking facility or venue has fully-automated systems to handle and route checked bags, where the luggage goes around various routing and gets read by automated systems along the way to achieve a given bag routing, corresponding to the travel info associated with the bag as indicated on the bag tag (which is automatically read by the routing system).

Accordingly, an embodiment involves incorporating the securing device unlock function into the automated bag routing system, enabling the routing system to read the bag tag on a bag flagged for or otherwise diverted by bag diverters 50 to inspection (by TSA). The automated bag routing system may include bag scanning devices to extract or otherwise obtain the securing device unlock code associated with that bag and unlock the bag before presenting the bag to the bag inspection station 54 for (TSA) inspection. This provides a benefit of not having the (TSA) inspector perform the action of unlocking the securing device of the bag, as well as application of the unlock code to the securing device of the bag before the bag is presented for (TSA) inspection. In this embodiment, the unlock code is not transmitted to the inspector of the bag and remains with the travel carrier (the bag unlock code is not passed to, extracted by, or used by the (TSA) inspection entity, because the inspector will receive an already-unlocked bag). This embodiment would ensure that the securing device unlock code is not transmitted beyond the carrier, which was the direct recipient of the unlock code transmitted by the traveler or owner of the bag. In this embodiment the bag inspector would not use the handheld device (barcode or RFID scanner or reader) to unlock the securing device. The carrier bag routing system would unlock the securing device and relay an unlocked bag for inspection of contents.

As described above, conveyor systems including conveyor belts, bag scanners or readers, and bag diverters are used to route bags. A travel carrier pulls a bag out of airplane compartment, and places it on the conveyor system. The conveyor system scans or reads the bag, looks up bag information for the bag, and determines whether the bag should be diverted for enhanced screening. In another embodiment, the conveyor system determines whether a scanned bag is designated for secure pickup. If so, instead of just sending the bag on to the pickup carousel with all the other unsecured bags, the conveyor system can automatically divert such bags to, e.g., a luxury or attended secure pickup area, or an automated secure pickup area such as an electronic locker system. Such pickup areas securely hold the bag for the traveler, and do not release the bag without verification. Such embodiments ensure that, e.g., a luxury bag with expensive items is released only to the intended owner.

Figure 4:
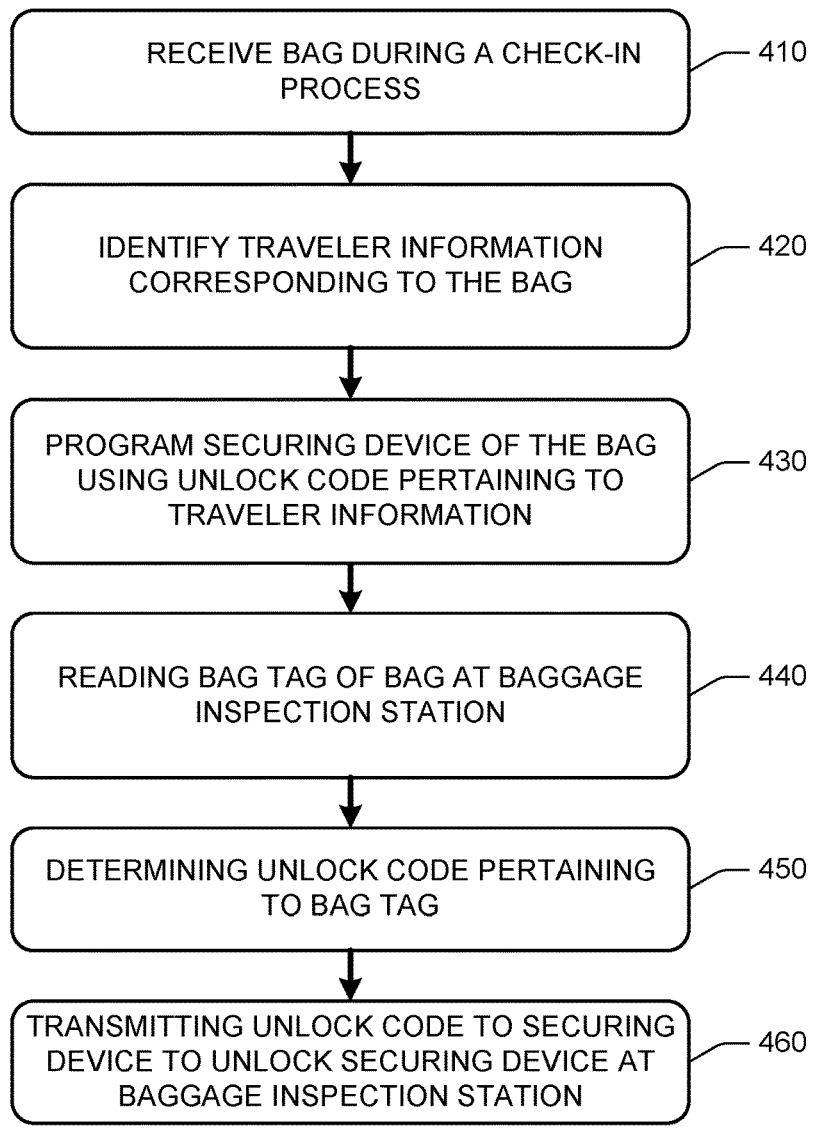
FIG. 4 illustrates a bag unlock method of unlocking a securing device according to an embodiment.

FIG. 4 illustrates a bag unlock method 400 of unlocking a securing device according to an embodiment. In block 410, a travel carrier receives a bag during a check-in process. In an embodiment, the bag includes a securing device designed to be applied to an individual piece of airline luggage, the securing device having a securing feature controlled by non-physical technologies (Bluetooth, phone application, radio frequency identification (RFID) etc.).

In block 420, the travel carrier identifies traveler information corresponding to the bag. In an embodiment, the travel carrier looks up booked travel reservations using the traveler's identity, and accesses such travel information. The travel information includes an unlock code provided by the traveler when booking the travel reservations. The unlock codes may be associated with the traveler, conveyed to the travel carrier system, and subsequently encrypted and affixed to the bag, e.g., when the traveler checks the luggage with the airline for a flight.

In block 430, the securing device of the bag is programmed (whether by the traveler using a smartphone app, or in some embodiments, by the travel carrier using a bag drop scanner or reader) using the unlock code from the traveler information. In an embodiment, the travel carrier displays a QR code including a coded version of the unlock code, so that the traveler can scan or read the QR code using a smartphone app. The smartphone app then compares the code on file with the travel carrier (as presented in the QR code) with the code actually stored in the securing device. If the codes do not match, the smartphone app alerts the traveler to update the securing device code, e.g., by programming the securing device to additionally include the unlock code that was presented in the QR code. In another embodiment, the travel carrier derives the unlock code from a digital identity of the traveler, whether presented when making travel reservations, or as presented at check in or bag drop.

In block 440, the bag tag is read by a scanner or reader located at the baggage inspection station. In an embodiment, the bag has been dropped off by the traveler and ingested into the bag handling system. A series of conveyor belts transfer the bag through the bag handling system. If flagged for inspection, a bag diverter redirects the bag toward the baggage inspection station. At the baggage inspection station, just outside, a bag scanner or reader is installed to scan or read the bag tag as it passes along the diverted conveyor belt toward the entrance into the baggage inspection station.

In block 450, the bag scanner or reader determines the unlock code pertaining to the bag tag. In an embodiment, the bag scanner or reader directly decodes the unlock code from the bag tag, because the bag tag was encoded into the bag tag. In another embodiment, the bag scanner or reader reads a token from the bag tag and communicates the token to a travel carrier back end. The back end looks up the token, and retrieves an unlock code stored by the carrier corresponding to the token. The back end then transmits the unlock code to the bag scanner or reader.

In block 460, the bag scanner or reader transmits the unlock code to the securing device to unlock the securing device at the baggage inspection station. In an embodiment, the bag scanner or reader transmits the unlock code to the securing device, unlocking it. In another embodiment, the bag scanner or reader is hand-held, and operated by an employee that manually scans or reads the bag code and unlocks the bag. The unlock code is used to unlock the securing device or securing feature, enabling the bag to be presented for luggage screening inspection and subsequent release from inspection. Alternatively, the travel carrier system provides the TSA with access to a scanning or reading device that can detect the unlock codes associated with the traveler's encrypted passcode (as stored in the bag tag) and transmit the unlock codes to the securing device, causing it to unlock. In an embodiment, after release from the baggage inspection station, the unlock code is rendered obsolete or unusable, thus protecting the luggage and fulfilling the traveler's expectation of personal security.

Figure 5:
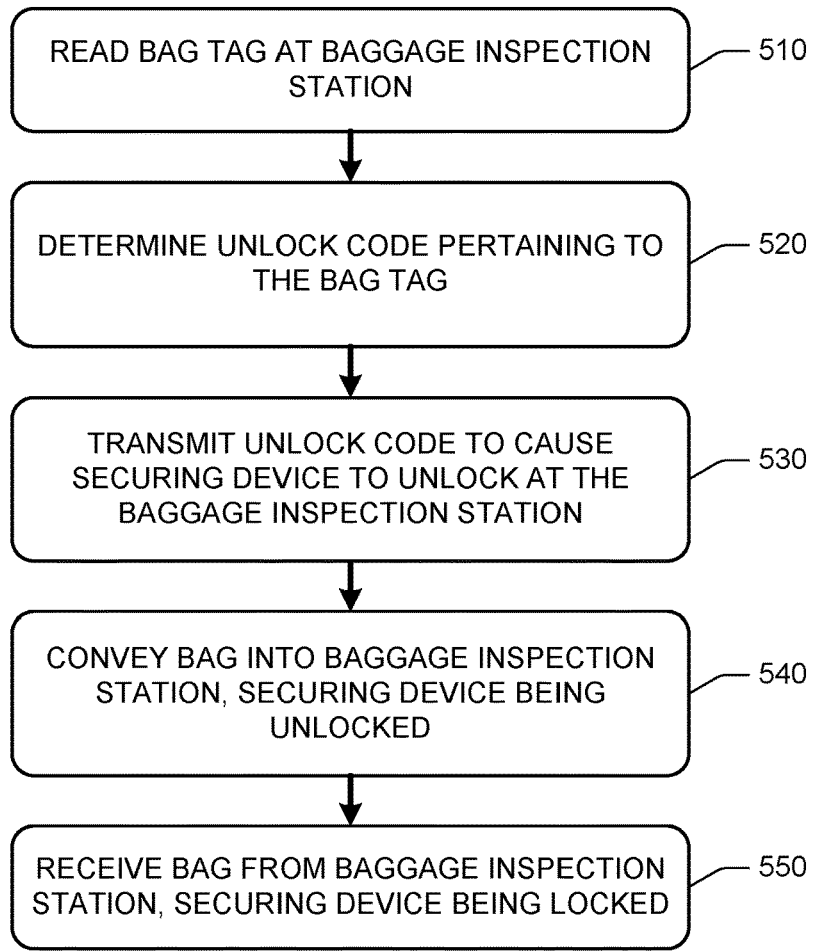
FIG. 5 illustrates a bag conveyance method of conveying a bag into a baggage inspection station unlocked according to an embodiment.

FIG. 5 illustrates a bag conveyance method 500 of conveying a bag into a baggage inspection station unlocked according to an embodiment. In block 510, the bag tag is read by a scanner or reader located at the baggage inspection station. In an embodiment, a bag diverter redirects the bag toward the baggage inspection station. At the baggage inspection station, just outside, a bag scanner or reader is installed to scan or read the bag tag as it passes along the diverted conveyor belt toward the entrance into the baggage inspection station.

In block 520, the bag scanner or reader determines the unlock code pertaining to the bag tag. In an embodiment, the bag scanner or reader directly decodes the unlock code from the bag tag, because the bag tag was encoded into the bag tag. In another embodiment, the bag scanner or reader reads a token from the bag tag and communicates the token to a travel carrier back end. The back end looks up the token, and retrieves an unlock code stored by the carrier corresponding to the token. The back end then transmits the unlock code to the bag scanner or reader.

In block 530, the bag scanner or reader transmits the unlock code to the securing device to cause the securing device to unlock at the baggage inspection station. In an embodiment, the bag scanner or reader transmits the unlock code to the securing device, unlocking it. In another embodiment, the bag scanner or reader is hand-held, and operated by an employee that manually scans or reads the bag code and unlocks the bag.

In block 540, the bag handling system conveys the unlocked bag into the baggage inspection station. In an embodiment, the baggage inspection station is staffed by TSA employees, who are concerned with bag inspection and are not concerned with unlocking bags. Accordingly, the responsibility of unlocking bags falls on the bag handling system prior to conveying the bags to the baggage inspection station.

In block 550, the bag handling system receives the bag from the baggage inspection station, the securing device being locked. In an embodiment, the bag handling system includes an exit scanner or reader, installed at an exit of the baggage inspection station. The exit scanner transmits a "lock" signal to the securing device, causing it to automatically lock the bag upon exiting the baggage inspection station. Accordingly, the baggage inspection station is not concerned with the locking of the bags. In another embodiment, the baggage inspection station includes, as an operational function, the locking of the bag when returned to the bag handling system's conveyor belt exiting the baggage inspection station. Accordingly, the baggage inspection station ensures that bags are locked when exiting and is not concerned with the unlocking of the bags.

Figure 6:
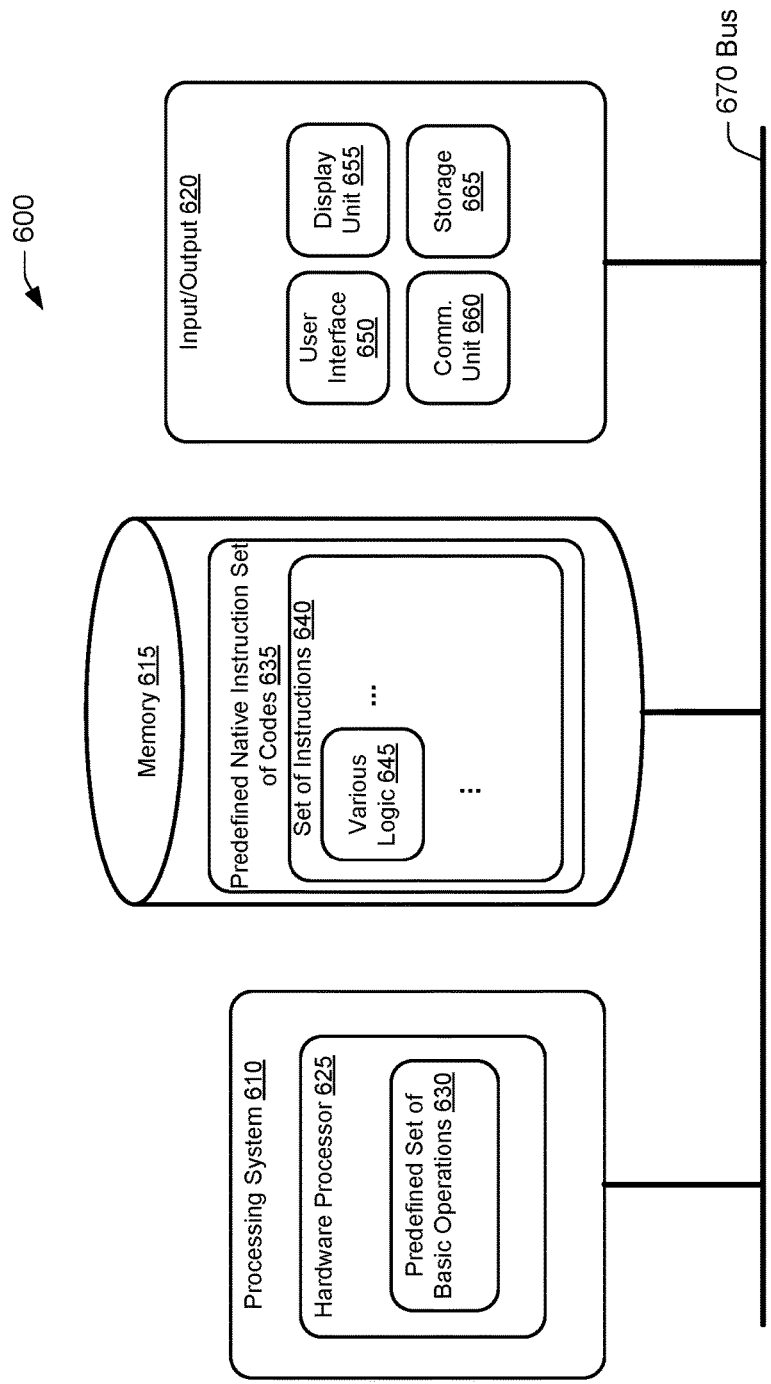
FIG. 6 illustrates a computing system including logic according to an embodiment.

FIG. 6 illustrates an apparatus or a computer system 600, or apparatus, including logic according to an embodiment. The computer system 600 includes a processing system 610 having a hardware processor 625 to perform a predefined set of basic operations 630 by loading corresponding ones of a predefined native instruction set of codes 635 as stored in the memory 615.

Here, the term computer system includes a processing system such as processing system 610 and a memory such as memory 615 accessible to the processing system. Such systems serve, in an embodiment, as the processor 100 and memory 130 of the securing device 10 illustrated in FIG. 1.

The processing system includes at least one hardware processor, and in other embodiments includes multiple processors or multiple processor cores. In one embodiment, a computer system is a standalone device. The processing system in another embodiment includes processors from different devices working together. In embodiments, a computer system includes multiple processing systems that communicate cooperatively over a computer network.

The following discussion explains how the logic, that implements the foregoing operations (e.g., programming logic 150, unlocking logic 160, and tracking logic 170 illustrated in FIG. 1), transforms the hardware processor of computer system 600 into a specially-programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits that respond to one set of ordered binary values one way and to another set of ordinary values another way, in accordance with the hardware design of the hardware processor. A given set of ordered binary values to which the hardware processor is designed to respond, in a predefined manner, is an instruction.

The collection of valid instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, an instruction or a sequence of instructions is selected from the predefined native instruction set of that hardware processor.

A sequence of codes that a hardware processor is to execute, in the implementation of a given task, is referred to herein as logic. Logic is made up of, in contrast to software, a sequence of codes or instructions, selected from the predefined native instruction set of codes of the hardware processor, and stored in the memory.

Returning to FIG. 6, the memory 615 is accessible to the processing system 610 via the bus 670. The processing system controls also the input output unit 620 via the bus 670. The input output unit 620 includes a user interface controller 650, a display unit controller 655, a communications unit controller 660, and storage controller 665.

The memory 615 includes the predefined native instruction set of codes 635, which constitute a set of instructions 640 selectable for execution by the hardware processor 625. In an embodiment, the set of instructions 640 include various logic 645 representing the securing device 10 as illustrated in FIG. 1, including the programming logic 150 (a first respective sequence of instructions), the unlocking logic 160 (a second respective sequence of instructions), and the tracking logic 170 (a third respective sequence of instructions). The terms first through third in this paragraph do not imply any order of operation or use and are used for discrimination of one sequence of instructions from another.

The various logic 645 is stored in the memory 615 and comprises instructions 640 selected from the predefined native instruction set of codes 635 of the hardware processor 625, adapted to operate with the processing system 610 to implement the process or processes of the various logic 645.

Conclusion

The various networks are illustrated throughout the drawings and described in other locations throughout this disclosure and can comprise any suitable type of network such as the Internet or a wide variety of other types of networks and combinations thereof. In an embodiment, the network may include a wide area network (WAN), a local area network (LAN), a wireless network, an intranet, the Internet, a combination thereof, and so on. Further, although a network is shown, a network can include multiple networks.

Computer storage media or memory includes volatile and non-volatile, removable and non-removable media and memory implemented in any method or technology for storage of information such as computer readable instructions, data structures, program modules, or other data. Computer storage media include, and are not limited to, random access memory (RAM), non-programmable memory (ROM), electrically erasable programmable memory (EEPROM), flash memory or other memory technology, compact disc non-programmable memory (CD-ROM), digital versatile disc (DVD) or other optical storage, magnetic cassettes, magnetic tape, magnetic disk storage or other magnetic storage devices, or any other medium which can be used to store the information and which can be accessed by a mobile device, computer, server, and so forth. In an embodiment, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special-purpose computer with the ascribed characteristics.

In an embodiment, a module comprises a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features or methodological steps, it is to be understood that the subject matter defined in the appended claims is not necessarily limited to the specific features or steps described. The specific features and steps are disclosed as example forms of implementing the claimed subject matter.

In accordance with some embodiments, information is stored in memory (at least temporarily) during performance of the methods for a variety of reasons. Example rationales include, and are not limited to, data processing convenience, communication convenience, permit batch validation or review, records maintenance, and so on, and combinations thereof.

Although headings are used for the convenience of the reader, these are not to be taken as limiting or restricting the systems, techniques, approaches, methods, devices to those appearing in any particular section. The teachings and disclosures herein can be combined or rearranged with other portions of this disclosure and the knowledge of one of ordinary skill in the art. It is the intention of this disclosure to encompass and include such variation.

What is claimed is:

1. A bag-securing method, comprising:
   receiving, into a travel carrier system of a travel carrier, traveler information from a traveler who is booking a travel reservation via an online internet interface of a reservation system of the travel carrier;
   generating, by the travel carrier, an unlock code for a securing device that is a bag lock associated with a bag of the traveler, the unlock code being based on the traveler information received from the traveler;
   storing the unlock code at the travel carrier system;
   receiving the bag from the traveler during a check-in process temporally separated from, and at some time after, booking the travel reservation;
   checking identification of the traveler to retrieve the unlock code stored for the traveler;
   programming the bag lock of the bag using the unlock code to secure the bag lock; and
   generating, by the travel carrier system, a bag tag associated with the unlock code for the bag.

2. The method of claim 1, further comprising requesting, by the travel carrier, release of the traveler information as identity information from a mobile driver's license (mDL) digital identity of the traveler.

3. The method of claim 2, further comprising:
   validating the mDL of the traveler, and
   automatically populating relevant fields of the travel reservation for the traveler using the traveler information obtained via the mDL.

4. The method of claim 2, further comprising:
   reading, by the travel carrier, the mDL of the traveler;
   generating an identity token corresponding to the mDL of the traveler;
   sending a copy of the identity token to an authorizing source;
   receiving verification of the mDL from the authorizing source; and
   retrieving, from a travel carrier back end storage responsive to receiving verification of the mDL, the unlock code corresponding to the mDL of the traveler.

5. The method of claim 1, wherein travel carrier generates the unlocking code by deriving the unlock code from a digital identity of the traveler by generating a token based on the digital identity of the traveler.

6. The method of claim 1, further comprising encoding into the bag tag, by the travel carrier, a token associated with the traveler, wherein the bag tag is readable to extract the token and use the token to look up and retrieve from a travel carrier back end the unlock code corresponding to the traveler.

7. The method of claim 6, wherein the token comprises at least one of: a random code, a carrier identification number associated with the traveler, a travel reservation number associated with the traveler, or a booking reservation number associated with the traveler.

8. The method of claim 6, wherein the token comprises a hash of at least one of: a random code, a carrier identification number associated with the traveler, a travel reservation number associated with the traveler, or a booking reservation number associated with the traveler.

9. The method of claim 1, wherein the traveler information comprises at least one of: a frequent flyer number, a carrier-assigned traveler identifier number, a travel reservation number, or a travel reservation code.

10. The method of claim 1, further comprising:
    associating, by the travel carrier, the unlock code with a biometric record of the traveler;
    storing the unlock code at a travel carrier back end storage;
    verifying that the traveler matches the biometric record; and
    responsive to verifying the traveler, retrieving the unlock code corresponding to the traveler.

11. The method of claim 10, further comprising deriving, by the travel carrier, the unlock code from the biometric record based on an algorithmic transformation of the biometric record itself.

12. The method of claim 1, further comprising:
    during the check-in process or a bag check process, requesting confirmation from the traveler whether to keep the unlock code as previously booked; and
    responsive to the traveler desiring to change the unlock code, changing, by the travel carrier, the unlock code.

13. The method of claim 1, further comprising:
    during a bag check process, checking, by the travel carrier, whether a bag's unlock code of the bag lock of the bag being checked matches the unlock code stored at the travel carrier system; and responsive to a mismatch between the bag's unlock code and the unlock code stored at the travel carrier system, prompting the traveler to select whether to 1) update the unlock code stored at the travel carrier system to match the bag's unlock code, 2) update the bag's unlock code to match the unlock code stored at the travel carrier system, or 3) request from the traveler a new unlock code and program the bag lock with the new unlock code.

14. The method of claim 1, further comprising:
during a bag check process, requesting, by the travel carrier, that the traveler confirm a number of bags being checked;
displaying information about any existing unlock codes stored in bag locks of the bags; and
prompting the traveler whether to keep or overwrite the existing unlock codes, or add new unlock codes.

15. The method of claim 1, further comprising:
generating, by the travel carrier, a token corresponding to the unlock code; and
displaying the token encoded as a Quick Response (QR) code readable by a camera of a smartphone of the traveler, wherein an application on the smartphone of the traveler offers to update the bag lock of the bag of the traveler to match the unlock code presented via the QR code.

16. The method of claim 1, further comprising displaying the unlock code to the traveler via the reservation system of the travel carrier.

17. The method of claim 1, further comprising sending the unlock code to a smartphone application of the traveler.

18. The method of claim 1, further comprising:
receiving, from a smartphone application of the traveler in communication with the travel carrier, the unlock code;
matching the unlock code to a reservation of that traveler; and
storing the unlock code at the travel carrier system.

19. The method of claim 1, further comprising:
sending, from the travel carrier to a smartphone application of the traveler in communication with the travel carrier, the unlock code; and
sending an instruction to the traveler to use the smartphone application to program the bag lock with the unlock code.

20. The method of claim 1, further comprising:
requesting, by the travel carrier, the unlock code from the traveler; and
querying a smartphone application of the traveler to automatically download from the smartphone application the unlock code that the traveler approved in the smartphone application to be shared with the travel carrier.

21. The method of claim 1, further comprising:
wirelessly programming, via a transmitter of the travel carrier, the bag lock to accept the unlock code.

22. The method of claim 1, further comprising generating and updating, by the travel carrier, a data file associated with the traveler, to log unlocking instances of the bag lock.

23. The method of claim 1, further comprising prompting, via a kiosk at a check-in location of the travel carrier, the traveler with a status of the bag lock and the unlock code of the bag the traveler is dropping off with the travel carrier.

24. A bag-securing method, comprising:
receiving, into a travel carrier system of a travel carrier, traveler information from a traveler who is booking a travel reservation via an online internet interface of a reservation system of the travel carrier, the traveler information comprising an unlock code for a securing device that is a bag lock associated with a bag of the traveler;
storing the unlock code at the travel carrier system;
receiving the bag from the traveler during a check-in process temporally separated from, and at some time after, booking the travel reservation;
checking identification of the traveler to retrieve the unlock code stored for the traveler; and
communicating the unlock code to the traveler.

25. The method of claim 24, further comprising querying the traveler whether to continue using or replace the unlock code.

26. The method of claim 24, further comprising:
generating, by the travel carrier, a candidate unlock code; and
prompting for traveler consent to use the candidate unlock code to program the bag lock.

27. A method for secure bag pick up, comprising:
reading, by a travel carrier during a bag drop process, a mobile driver's license (mDL) digital identity of a traveler associated with a bag being dropped off;
generating an identity token corresponding to the mDL of the traveler;
storing an association between the identity token and the bag of the traveler at a travel carrier system;
sending a copy of the identity token to an authorizing source;
receiving verification of the mDL from the authorizing source;
reading, by the travel carrier during a bag pick up at a secure pick up area, the mDL of the traveler;
generating the identity token corresponding to the mDL of the traveler;
retrieving the association between the identity token and the bag of the traveler;
determining the bag corresponding to the mDL, based on the association;
scanning the bag at the secure pick up area that is to be securely picked up; and
verifying that the bag to be securely picked up corresponds to the bag of the traveler attempting to pick up the bag.

28. The method of claim 27, further comprising performing a liveness check of the traveler, to verify that the traveler attempting to pick up the bag at the secure pick up area matches the traveler of the mDL from the association stored and retrieved.

29. The method of claim 27, further comprising:
determining, by the travel carrier, that the traveler has designated the bag for secure pick up;
diverting the bag to the secure pick up area;
securely holding the bag for the traveler at the secure pick up area;
prompting the traveler to provide a bag unlock code; and
releasing the bag to a traveler, responsive to verifying the bag unlock code provided by the traveler unlocks a bag lock of the bag.

30. The method of claim 27, wherein the secure pick up area comprises an automated secure pick up area including an electronic locker system.

* * * * *